United States Patent
Smith et al.

(10) Patent No.: US 6,453,576 B2
(45) Date of Patent: Sep. 24, 2002

(54) CONTROL OF SOLIDS DEPOSITION FROM USED DESICCANT SOLUTION

(75) Inventors: Kevin W. Smith, McMurray, PA (US); Lori G. Acor, Houston, PA (US); Joseph Miller, Aliquippa, PA (US); Mark J. Wanner, Monaca, PA (US)

(73) Assignee: Clearwater, Inc., Pittsburgh, PA (US)

( * ) Notice: Subject to any disclaimer, the term of this patent is extended or adjusted under 35 U.S.C. 154(b) by 0 days.

(21) Appl. No.: 09/795,182

(22) Filed: Mar. 1, 2001

Related U.S. Application Data

(60) Provisional application No. 60/192,306, filed on Mar. 27, 2000.

(51) Int. Cl.[7] .................................................. F26B 1/00
(52) U.S. Cl. .............................. 34/343; 34/80; 34/472; 34/474; 34/134; 34/DIG. 1; 96/120; 96/108
(58) Field of Search ................................. 34/72, 79, 80, 34/472, 473, DIG. 1, 343, 74, 81, 578, 474, 134; 62/94; 96/118, 119, 120, 124, 127, 138, 142, 108, 134, 139

(56) References Cited

U.S. PATENT DOCUMENTS

| | | | | | |
|---|---|---|---|---|---|
| 1,821,549 | A | * | 9/1931 | Hornor et al. ................. 55/388 |
| 2,143,008 | A | | 1/1939 | Heath et al. | |
| 2,241,600 | A | * | 5/1941 | Hunsicker ................... 252/194 |
| 2,322,469 | A | * | 6/1943 | Robson ........................ 91/193 |
| 2,390,104 | A | * | 12/1945 | Kaufman .................... 183/4.3 |
| 2,804,940 | A | | 9/1957 | Hutchinson | |
| 3,145,089 | A | * | 8/1964 | Norton .......................... 3/961 |
| 3,158,456 | A | * | 11/1964 | Norton ........................ 55/388 |
| 3,224,212 | A | * | 12/1965 | Engdahl ........................ 62/40 |
| 3,589,105 | A | * | 6/1971 | Becker ......................... 55/221 |
| 4,247,991 | A | * | 2/1981 | Mehta ........................... 34/35 |
| 4,487,617 | A | * | 12/1984 | Dienes et al. ................. 55/163 |
| 4,819,446 | A | * | 4/1989 | Moore ....................... 62/238.3 |
| 4,910,971 | A | * | 3/1990 | McNab ........................ 62/310 |
| 4,968,223 | A | * | 11/1990 | Da Costa .................... 417/366 |
| 5,048,200 | A | * | 9/1991 | Ryham ......................... 34/32 |
| 5,497,561 | A | * | 3/1996 | Murray et al. ................. 34/80 |
| 5,733,841 | A | | 3/1998 | Thomas | |
| 5,753,013 | A | * | 5/1998 | Dingfelder ..................... 95/70 |
| 5,766,309 | A | * | 6/1998 | Thomas ......................... 95/91 |
| 5,797,272 | A | * | 8/1998 | James ........................... 62/93 |
| 5,882,383 | A | | 3/1999 | Dingfelder | |
| 6,119,711 | A | | 9/2000 | Dougherty | |

\* cited by examiner

*Primary Examiner*—Ira S. Lazarus
*Assistant Examiner*—K. B. Rinehart
(74) *Attorney, Agent, or Firm*—William L. Krayer

(57) ABSTRACT

In a gas dryer for use in a gas transmission line in which a bed of desiccant tablets is suspended in the flow of gas, making an aqueous solution of the desiccant salts from the moisture taken from the gas, the solution is inhibited from generating solids and precipitates in a sump area by conducting the heat of hydration from the bed area to the sump area.

18 Claims, 4 Drawing Sheets

CONTROL OF SOLIDS DEPOSITION FROM USED DESICCANT SOLUTION

RELATED APPLICATION

This application is based on and incorporates in its entirety Provisional Application Ser. No. 60/192,306 filed Mar. 27, 2000, and claims the benefit of its filing date.

TECHNICAL FIELD

This invention relates to gas drying. More particularly, it relates to inhibiting the formation and deposition of solids from used desiccant solutions.

BACKGROUND OF THE INVENTION

Moisture is commonly removed from natural gas in gas transmission lines by passing the gas through a gas dryer which holds a bed of desiccant tablets. As the desiccant tablets pick up moisture, a solution is formed of the desiccant salts. The solution drains into a sump area from which it is removed, usually by periodic draining.

A problem exists with such dryers and desiccants, in that the generally highly concentrated solutions of desiccant salts which drain into the sump tend to crystallize or otherwise come out of solution, and remain in the sump when the solution is drained or otherwise removed. In the quiescent sump, the solidified salts resist redissolving, and tend to build up over time, occupying sump volume and necessitating frequent manual removal. Gas transmission lines and dryers are placed and used throughout a wide variety of climatic and seasonal conditions, and, although the problem of solids formation is probably more acute in locations where temperatures are lowest, it presents itself even in warmer climates because the salts will come out of solution in the cooler or colder evening and night temperatures.

A possible remedy for the problem would be to provide a heater for the sump solution, but this is not economically desirable.

SUMMARY OF THE INVENTION

We have invented a method of inhibiting solids formation in solutions of used desiccant salts which comprises conveying the heat of hydration from the desiccant bed to the solution of used desiccant salts in a sump. The heat of hydration may be transported in any feasible manner, but we prefer to use either a heat exchange fluid in an enclosure, or a heat conductor in the form of rods. Optionally, we may agitate the solution in the sump. For example, the force of the gas flow in the dryer may be used to turn mixing blades in the sump.

We use the term "heat of hydration" herein to include heat of solution.

DETAILED DESCRIPTION OF THE INVENTION

The invention will be described with respect to a dryer for natural gas in a natural gas transmission line, but it should be understood that it is applicable to any type of gas drying where solid drying salts are used to remove moisture from a gas, forming a solution which then is accumulated in a holding area or vessel, where it normally would tend to form precipitates, crystals, or other solid materials.

Figure 1:
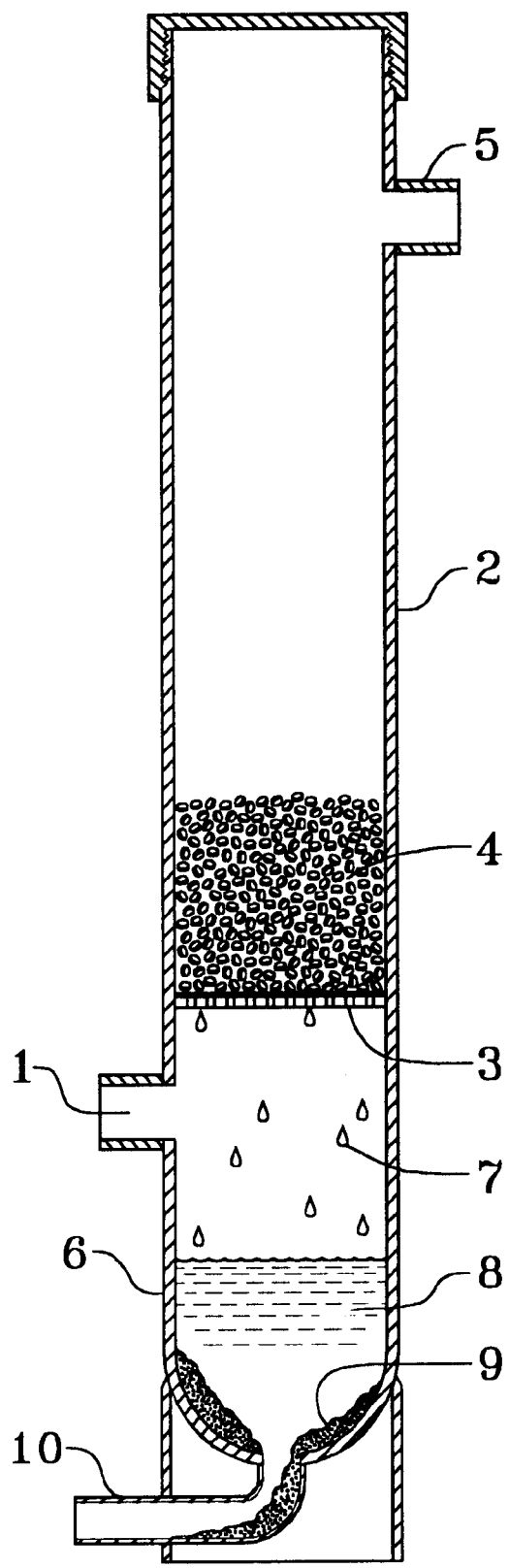
FIG. 1 is a simplified view of a typical prior art conventional gas dryer for a gas transmission line, showing the placement of the desiccant tablets, the sump area, and a typical buildup of solids which is the problem we attack.

Referring now to FIG. 1, natural gas in line 1 enters the dryer vessel 2 at a point below perforated plate 3 which holds a bed of desiccant tablets 4. The gas flows upward through the bed of desiccant tablets 4, which remove moisture, and leaves the vessel through outlet 5 for further transmission or use. The moisture from the gas accumulates on the tablets 4, forming drops 7 of desiccant salt solution which fall into sump area 6. Solution 8 in sump area 6 is generally highly concentrated, and will form solids 9 which accumulate in the sump area 6. Drain 10, designed to remove the solution in sump area 6, is ineffective at removing the solids 9, which may adhere to the walls of sump area 6.

Figure 2:
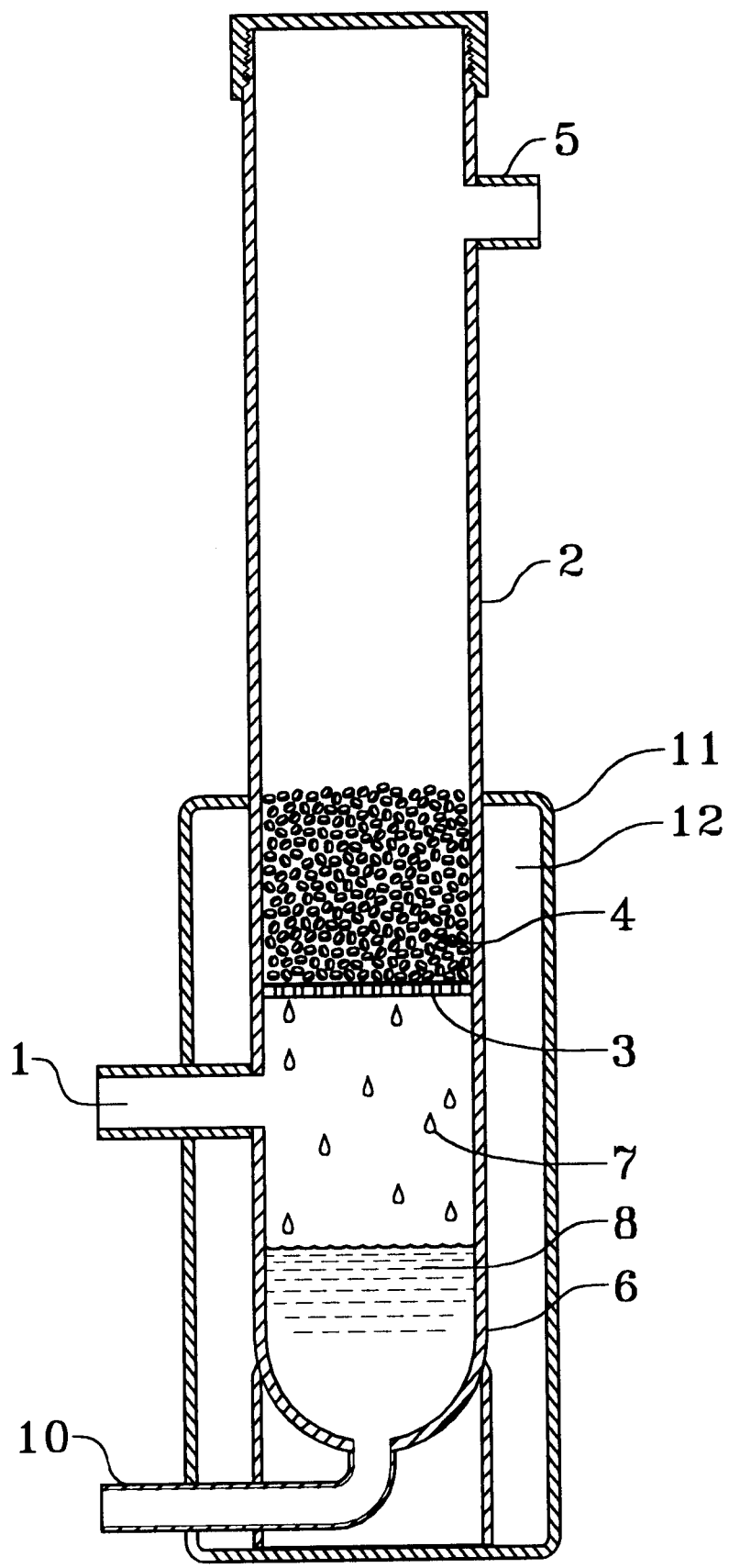
FIG. 2 is a simplified view of a gas dryer equipped with a jacket of our invention for containing a heat exchange fluid for transferring the heat of solution of the desiccant salts from the tablet bed to the sump.

In FIG. 2, the vessel 2 is surrounded by a jacket 11 containing a heat exchange fluid 12. No moving parts are necessary. Jacket 11 and heat exchange fluid 12 extend to a level high enough on the bed of desiccant tablets 4 to assure that contact is made with the portion of the bed of desiccant tablets 4 which generates the most heat of hydration. The heat of hydration generated by removal of moisture from the gas is thus transferred through the wall of vessel 2 and into heat exchange fluid 12. The jacket 11 and heat exchange fluid 12 extend downward to surround the sump area 6, and thus the heated heat exchange fluid will contact the wall of sump area 6, heating or warming it, and the heat is thereby transferred into solution 8 in sump area 6. Solution 8 is thus maintained at a temperature higher than it would otherwise be, thereby inhibiting crystal formation, precipitation, and other solids deposition likely to occur, particularly when the ambient temperature falls.

Figure 3:
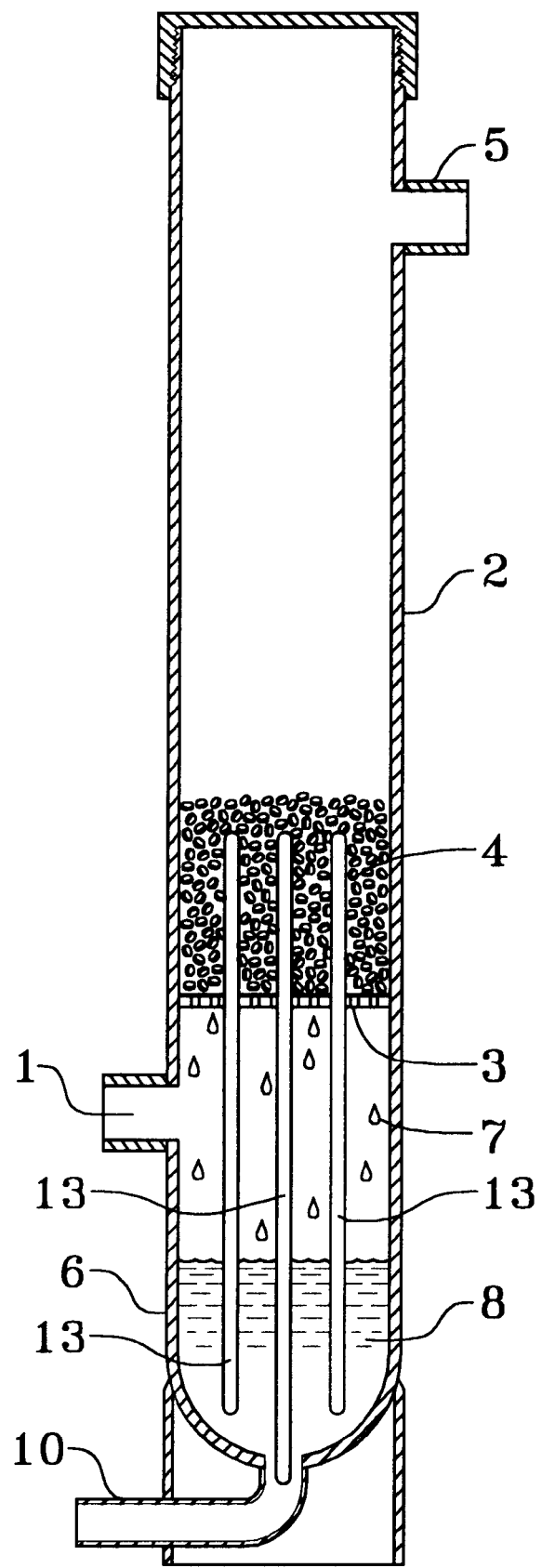
FIG. 3 is a simplified view of a gas dryer equipped with heat conducting rods of our invention, for conducting heat from the desiccant tablet bed to the sump area.

FIG. 3 shows heat conducting rods 13 installed to collect the heat of hydration in the bed of tablets 4 and conduct it downwards to solution 8 in sump area 6, thus accomplishing essentially the same objective as the jacket 11 and heat exchange fluid 12 in FIG. 2. Again, the solution 8 is maintained at a temperature higher than it would otherwise be, thus inhibiting the formation of solids.

Figure 4:
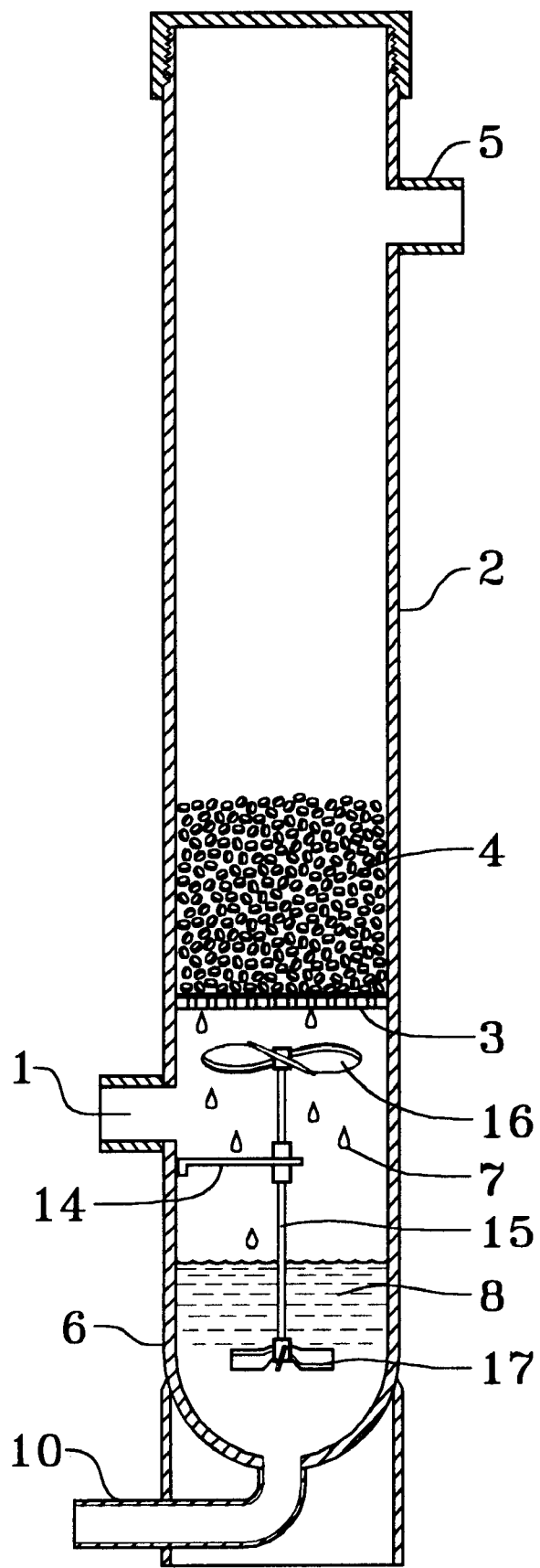
FIG. 4 is a simplified view of the placement of a mixer to be turned by the flow of gas in the gas dryer.

Looking now at FIG. 4, bracket holds a rod 15 having a propeller 16 on its upper end and mixing blades 17 on its lower end. Rod 15 may rotate in bracket 14 and is caused to turn by the upward flow of gas in vessel 2; the rotation of propeller 16 causes the rotation of mixing blades 17 placed at a level so as to agitate solution 8 in sump area 6. Agitation of solution 8 inhibits the formation of solids regardless of whether heat has been transferred to the sump area 6 from the heat of hydration in the bed of tablets 4, but we prefer to use the propeller and mixing blades together with one or the other of the devices of FIG. 2 or FIG. 3.

Bearing in mind that the illustrations are a preferred embodiment, it should be understood that the perforated plate is only one means for holding the bed of solid desiccant, and that other devices may be used for forming a chamber for the bed and retaining the tableted or otherwise solid desiccants, and collecting the solution of desiccant salts which will inevitably be formed when moisture is removed from the gas. Likewise our invention is not limited to the transmission of natural gas but may be used in air drying and the drying of other gases.

The usual manner of operating a gas dryer such as the one illustrated is to place desiccant tablets on the perforated plate to a depth sufficient to remove a significant portion of the moisture in the gas at its usual flow rate. As the tablets are consumed, the bed depth will recede. Usually, the tablets will be replenished when the bed depth reaches a level where drying is of borderline effect. Most of the dehydration of the gas takes place in the bottom few inches of the bed, since the newly introduced gas contains its highest concentration of water at that point. Thus, most of the heat of hydration is generated in the lower end of the bed, but of course this may vary with the design of the vessel, the flow rate of the gas, the usual moisture content of the gas, and other factors. Where $CaCl_2.6H_2O$ is present, the heat of solution is negative, however. Accordingly, where calcium chloride is an important part of the desiccant, we prefer to assure that heat is removed from the upper regions of the desiccant bed as well as the lower, because the upper regions will contain a higher ratio of $CaCl_2$, $CaCl_2.H_2O$, $CaCl_2.2H_2O$, and $CaCl_2.4H_2O$. It is known that $CaCl_2.H_2O$ and $CaCl_2.2H_2O$ have higher heats of solution than either anhydrous or the other hydrates of $CaCl_2$.

Lithium chloride is also useful as a desiccant in our invention. LiCl, $LiCl.H_2O$, and $LiCl.2H_2O$ all have positive heats of solution. Other inorganic salts may also be used, but mixtures of calcium chloride and lithium chloride, in any ratio, are preferred variations for the desiccant tablets, although we may also use either by itself, and our invention applies to the use of any desiccant tablets or other solids which generate a heat of solution.

Following are certain heats of solution, in kg.-cal./g.mole, as taken from a standard chemical engineer's handbook:

| | |
|---|---|
| $CaCl_2$ | +4.9 |
| $CaCl_2 \cdot H_2O$ | +12.3 |
| $CaCl_2 \cdot 2 H_2O$ | +12.5 |
| $CaCl_2 \cdot 4 H_2O$ | +2.4 |
| LiCl | +8.66 |
| $LiCl \cdot H_2O$ | +4.45 |
| $LiCl \cdot 2H_2O$ | +1.07 |

Persons skilled in the art will appreciate that the most efficient use of our invention will call for reaching the lowest part of the sump area—that is, transferring at least some of the heat of hydration to the lowest part—so the solution in the sump will be warmed even when the solution level is relatively low, i.e. immediately after the sump area has been drained.

Accordingly, then, our invention is a method of inhibiting the formation of solids in a solution of desiccant salts obtained by drying gas, comprising removing heat of hydration (we use this term to include the heat of solution) during the gas drying and transferring the heat of hydration to the solution.

We may use any suitable heat exchange fluid for the variation of FIG. 2. An example of a suitable heat exchange fluid is a 50:50 solution of ethylene glycol and water. We prefer to use heat exchange fluids containing at least some potassium formate. Solutions of 0.5% to 75% by weight of potassium formate may be used.

For the variation of FIG. 3, we may use any suitable metal or other heat conducting rod, vein, or other device for connecting the lower portion of the tablet bed with the sump area.

In connection with FIG. 4, it should be understood that the flow rate of the gas in the vessel may vary and that its velocity may range from 0.1 to 10 feet per second. The force generated by the rotation of the propeller should overcome the viscosity of the solution, and accordingly the practitioner may wish to adapt the device of FIG. 4 to the peculiarities of his particular system. Ideally the device of FIG. 4 will provide continuous agitation sufficient to inhibit crystal and other solid formation under the full range of conditions in the particular vessel, including variations in temperature, gas flow, composition of the used solution, and concentration of the desiccant salts in the used solution. Preferably the entire propeller and mixing blade construction will be of materials resistant to corrosion and scale deposition. We do not intend to be limited to the illustrated method of agitation; any suitable means for agitating may be used. In an appropriate situation, for example, wind power may be used to agitate the solution in a sump, and of course an ordinary electric motor could also provide agitation force.

What is claimed is:

1. Method of inhibiting the formation of solids in a solution of desiccant salts obtained by drying flowing gas comprising moving an agitator in said solution wherein said agitator is moved by the force of said gas.

2. Method of inhibiting the formation of solids in a solution of desiccant salts obtained by drying gas by contact of said gas with solid desiccant salts, comprising recovering heat of hydration generated by the removal of moisture from said gas during contact with said solid desiccant salts, and transferring the heat of hydration generated by said contact to said solution.

3. Method of claim 2 wherein said desiccant salts comprise calcium chloride and lithium chloride in a weight ratio of from 0–100% to 100–0%.

4. Method of claim 2 wherein said solid desiccant salts are in a bed of tablets.

5. Method of claim 2 wherein said solution is in a sump area.

6. Method of claim 2 wherein said heat of hydration is transferred to said solution through a heat exchange fluid.

7. Method of claim 2 wherein said heat of hydration is transferred to said solution through metal elements.

8. Method of claim 2 including agitating said solution.

9. Apparatus for drying gas in a gas transmission line comprising a vessel including a chamber for holding a bed of solid desiccant, and means for transferring heat of hydration from said bed of solid desiccant to a sump for a used desiccant salt solution.

10. Apparatus of claim 9 wherein said means for transferring heat of hydration comprises at least one metal element for conducting heat of hydration.

11. Apparatus of claim 9 wherein said means for transferring heat of hydration comprises a vessel jacket for containing a heat exchange fluid.

12. Apparatus of claim 11 wherein said vessel jacket contains a heat exchange fluid comprising potassium formate.

13. Apparatus for drying gas in a gas transmission line comprising a vessel including a perforated plate for holding a bed of desiccant tablets, a sump area for holding used desiccant solution, and means for transferring heat from said bed of desiccant tablets to said sump area.

14. Apparatus of claim 13 wherein said means for transferring heat includes means for containing a solution comprising potassium formate.

15. Apparatus of claim 13 including means for agitating said used desiccant solution.

16. Apparatus of claim 15 wherein said means for agitating said used desiccant solution comprises at least one mixer blade powered by the flow of gas from said gas transmission line.

17. Apparatus of claim 13 wherein said means for transferring heat comprises metal rods.

18. Apparatus of claim 13 wherein said means for transferring heat comprises a vessel jacket containing a heat transfer fluid.

* * * * *